United States Patent
Xu

(10) Patent No.: US 9,778,793 B2
(45) Date of Patent: Oct. 3, 2017

(54) COLOR FILTER SUBSTRATE TO BE DISPOSED OPPOSITE TO AN ARRAY SUBSTRATE AND MANUFACTURING METHOD THEREOF

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Xiangyang Xu, Beijing (CN)

(73) Assignees: BOE TECHNOLOGY GROUP CO., LTD., Beijing (CN); HEFEI BOE OPTOELECTRONICS TECHNOLOGY CO., LTD, Hefei, Anhui (CN)

( * ) Notice: Subject to any disclaimer, the term of this patent is extended or adjusted under 35 U.S.C. 154(b) by 28 days.

(21) Appl. No.: 14/436,916

(22) PCT Filed: Nov. 1, 2013

(86) PCT No.: PCT/CN2013/086421
§ 371 (c)(1),
(2) Date: Apr. 20, 2015

(87) PCT Pub. No.: WO2015/007030
PCT Pub. Date: Jan. 22, 2015

(65) Prior Publication Data
US 2015/0234538 A1    Aug. 20, 2015

(30) Foreign Application Priority Data
Jul. 18, 2013    (CN) .......................... 2013 1 0302567

(51) Int. Cl.
*G06F 3/042* (2006.01)
*G06F 3/041* (2006.01)
(Continued)

(52) U.S. Cl.
CPC ........ *G06F 3/0421* (2013.01); *G02F 1/13338* (2013.01); *G02F 1/133514* (2013.01);
(Continued)

(58) Field of Classification Search
CPC .... G06F 3/0421; G06F 3/0416; G06F 3/0412; G06F 2203/04103; G02F 1/13338; G02F 1/133514; Y10T 29/49155
See application file for complete search history.

(56) References Cited

U.S. PATENT DOCUMENTS

2005/0243023 A1* 11/2005 Reddy ................. G09G 3/2011
345/48
2008/0030633 A1* 2/2008 Tsai .................... G02F 1/13338
349/12
(Continued)

FOREIGN PATENT DOCUMENTS

| CN | 101825787 A | 9/2010 |
|---|---|---|
| CN | 202351848 U | 7/2012 |

(Continued)

OTHER PUBLICATIONS

1st Office Action issued in Chinese application No. 201310302567.X dated Nov. 27, 2015.

*Primary Examiner* — Rodney Amadiz
(74) *Attorney, Agent, or Firm* — Nath, Goldberg & Meyer; Joshua B. Goldberg; Leonid D. Thenor

(57) ABSTRACT

The present invention discloses a color filter substrate and a manufacturing method thereof and a touch screen. The color filter substrate comprises a substrate and a black matrix arranged thereon, the black matrix defines a plurality of pixel units, in each of which a color filter is arranged; the color filter substrate further comprises light sensing units as well as touch scan lines and touch sensing lines insulated from each other, the light sensing units are positioned in the pixel units; the light sensing units, the touch scan lines and
(Continued)

the touch sensing lines are arranged in areas corresponding to the black matrix; and each light sensing unit is connected with one touch scan line and one touch sensing line and is positioned on one side of the black matrix that can receive external light.

20 Claims, 4 Drawing Sheets

(51) Int. Cl.
 *G02F 1/1335* (2006.01)
 *G02F 1/1333* (2006.01)
(52) U.S. Cl.
 CPC .......... *G06F 3/0412* (2013.01); *G06F 3/0416* (2013.01); *G06F 2203/04103* (2013.01); *Y10T 29/49155* (2015.01)

(56) References Cited

U.S. PATENT DOCUMENTS

| | | | |
|---|---|---|---|
| 2009/0152445 A1* | 6/2009 | Gardner, Jr. | G09G 3/3406 250/214 AL |
| 2010/0136868 A1* | 6/2010 | Chien | G06F 3/0412 445/24 |
| 2010/0214247 A1 | 8/2010 | Tang et al. | |
| 2012/0169962 A1* | 7/2012 | Yuki | G01J 1/02 349/61 |
| 2016/0266695 A1* | 9/2016 | Bae | G06F 1/1643 |

FOREIGN PATENT DOCUMENTS

| | | |
|---|---|---|
| CN | 102929031 A | 2/2013 |
| CN | 103019448 A | 4/2013 |
| CN | 203376707 U | 1/2014 |

\* cited by examiner

COLOR FILTER SUBSTRATE TO BE DISPOSED OPPOSITE TO AN ARRAY SUBSTRATE AND MANUFACTURING METHOD THEREOF

This is a National Phase Application filed under 35 U.S.C. §371 as a national stage of PCT/CN2013/086421, filed Nov. 1, 2013, an application claiming the benefit to Chinese Application No. 201310302567.X, filed Jul. 18, 2013; the content of each of which is hereby incorporated by reference in its entirety.

FIELD OF THE INVENTION

The present invention relates to the field of liquid crystal display, particularly to a color filter substrate, a manufacturing method thereof and a touch screen.

BACKGROUND OF THE INVENTION

Recently, liquid crystal display (LCD) technology has been developed rapidly, great progress has been made in both the size of a screen and the display quality, and LCDs, due to the characteristics of small size, low power consumption, no radiation and the like, have occupied a dominant role in the field of flat panel display.

A touch screen is an important device that integrates input and output terminals. In recent years, with the arising of a series of products such as small and light handheld equipments, the demand of markets for touch screens is increased sharply.

FIG. 1 is a structural schematic diagram of a touch screen in the prior art. The touch screen in the prior art is a voltage sensing touch screen and includes an array substrate and a color filter substrate. As shown in FIG. 1, the array substrate includes gate lines 1, data lines 2, and a set of touch scan lines 3, touch sensing lines 4 and light sensing units 5 which independently realizes a touch function, wherein each light sensing unit 5 includes two independent light sensing structures, to which the touch scan lines 3 and the touch sensing lines 4 is connected, respectively. When the touch screen is touched, the two light sensing structures send electric signals to the corresponding touch scan line 3 and touch sensing line 4, respectively. The coordinates of a touch point may be calculated after a control unit of the touch screen receives the electric signals from the touch scan line 3 and the touch sensing line 4, so that positioning of the touch point is realized.

When the touch screen carries out displaying, light is emitted from a backlight plate, but not all light can pass through a panel, e.g. at positions corresponding to signal lines (data lines 1, gate lines 2, touch scan lines 3 and touch sensing lines 4), thin film transistors (TFTs), storage capacitors and the like. It is not completely light-transmissive at these positions, and light passing these positions is not controlled by voltage, so that gray scales cannot be displayed accurately, and all these positions need to be shielded by a black matrix so as not to interfere with other light-transmissive areas.

Both the touch scan lines 3 and the touch sensing lines 4 are arranged on an array substrate with gate lines and data lines formed thereon in the prior art, which inevitably results in enlarged area of the black matrix on the color filter substrate and reduced area of light-transmissive areas of pixel units, and thus the aperture ratio of the pixel units decreases.

Moreover, by arranging the touch scan lines 3 and the touch sensing lines 4 on the array substrate, lines on the array substrate are excessive, the difficulty in manufacturing the touch screen is increased and defective productions are also increased.

SUMMARY OF THE INVENTION

The present invention provides a color filter substrate, a manufacturing method thereof, a touch screen and a display device, so as to improve the aperture ratio of pixel units, reduce the difficulty in manufacturing a touch screen and improve the yield.

To achieve the above object, the present invention provides a color filter substrate, including a substrate and a black matrix positioned on the substrate, wherein the black matrix defines a plurality of pixel units, in each of which a color filter is arranged, the color filter substrate further includes light sensing units, touch scan lines and touch sensing lines, wherein the touch scan lines and the touch sensing lines are insulated from each other, the light sensing units are positioned in the pixel units; the light sensing units, the touch scan lines and the touch sensing lines are arranged in areas corresponding to the black matrix; and each light sensing unit is connected with one touch scan line and one touch sensing line, and is arranged on one side of the black matrix capable of receiving external light.

Optionally, each light sensing unit has an integrated structure; and when the light sensing unit is irradiated by specific light, the light sensing unit enables the touch scan line to be connected to the touch sensing line.

Optionally, a timing pulse signal is applied to the touch scan line, and the touch sensing line outputs a pulse signal having the same time sequence as the timing pulse signal on the touch scan line when the touch scan line and the touch sensing line are connected by the light sensing unit.

Optionally, each pixel unit is provided therein the light sensing unit, or the light sensing units are arranged in the pixel units having intervals therebetween.

Optionally, each light sensing unit is a photosensitive semiconductor.

Optionally, each color filter includes a red color filter area, a green color filter area and a blue color filter area, and the light sensing unit is arranged in the blue color filter area.

To achieve the above object, the present invention further provides a touch screen, including an array substrate and a color filter substrate opposite to each other, wherein the array substrate includes gate lines and data lines, and the color filter substrate is the above-mentioned color filter substrate.

Optionally, the touch screen further includes a signal applying unit configured to apply touch scan signals to the touch scan lines and a signal processing unit configured to receive and process touch sensing signals in the touch sensing lines.

Optionally, both the signal applying unit and the signal processing unit are arranged on the color filter substrate, the signal applying unit is connected with the touch scan lines, and the signal processing unit is connected with the touch sensing lines.

Optionally, both the signal applying unit and the signal processing unit are arranged on the array substrate, the signal applying unit is connected with the touch scan lines through a flexible printed circuit board, and the signal processing unit is connected with the touch sensing lines through a flexible printed circuit board.

To achieve the above object, the present invention further provides a manufacturing method of a color filter substrate, including steps of: forming touch scan lines on a substrate; forming touch sensing lines on the substrate, wherein the touch scan lines and the touch sensing lines are insulated from each other; forming light sensing units on the substrate, wherein each light sensing unit is connected with one touch scan line and one touch sensing line; and forming a black matrix and color filters on the substrate, wherein the black matrix defines a plurality of pixel units, in each of which a color filter is arranged, the light sensing units are positioned in the pixel units, the light sensing units, the touch scan lines and the touch sensing lines are arranged in areas corresponding to the black matrix, and the light sensing units are positioned on one side of the black matrix capable of receiving external light.

In the present invention, by arranging, on the color filter substrate, the light sensing units, the touch scan lines and the touch sensing lines for realizing a touch function, the aperture ratio of the pixel units can be effectively improved, meanwhile, difficulty in manufacturing the touch screen is reduced, and the yield is improved.

DETAILED DESCRIPTION OF THE EMBODIMENTS

To make those skilled in the art better understand the technical solutions of the present invention, a color filter substrate, a manufacturing method thereof and a touch screen provided by the embodiments of the present invention will be described in detail below in combination with the accompanying drawings.

Embodiment I

Figure 1:
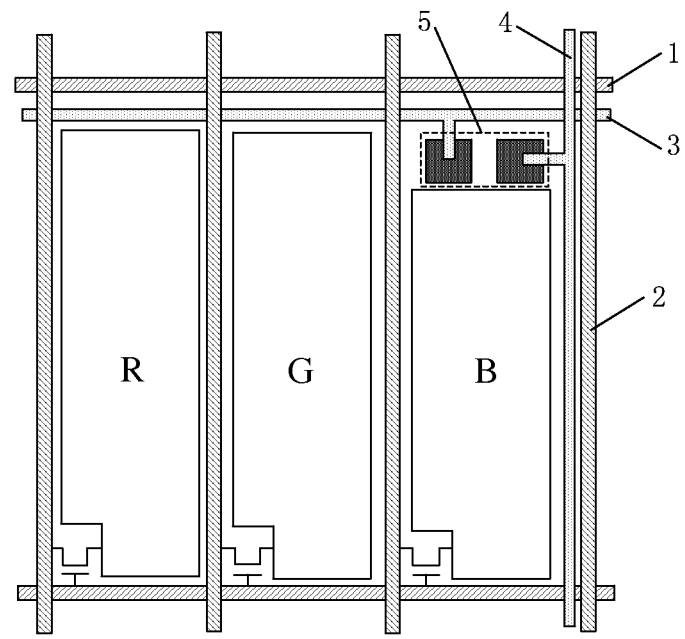
FIG. 1 is a structural schematic diagram of a touch screen in the prior art.
Figure 2:
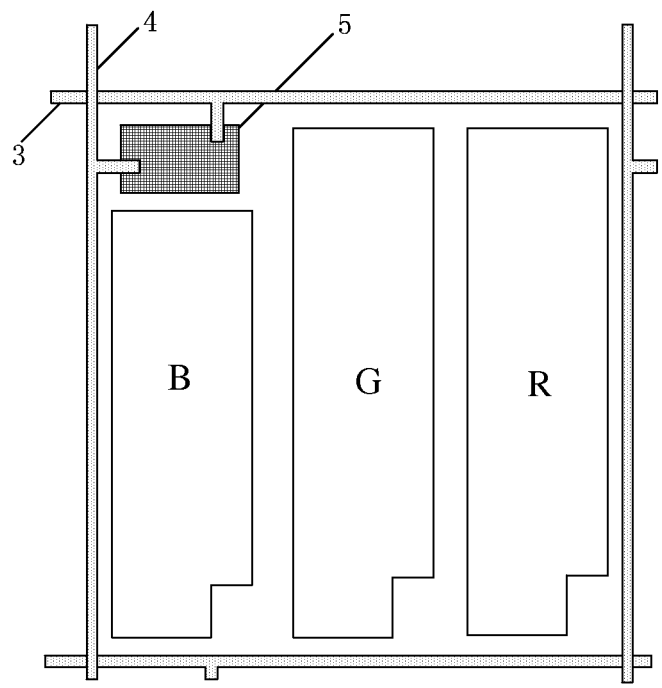
FIG. 2 is a schematic diagram of a color filter substrate provided by Embodiment I of the present invention.

FIG. 2 is a schematic diagram of a color filter substrate provided by Embodiment I of the present invention. The color filter substrate includes a substrate and a black matrix positioned on the substrate, wherein the black matrix defines a plurality of pixel units, in each of which a color filter is arranged. As shown in FIG. 2, the color filter substrate further includes light sensing units 5, touch scan lines 3 and touch sensing lines 4, wherein the light sensing units 5 are positioned in the pixel units; the light sensing units 5, the touch scan lines 3 and the touch sensing lines 4 are arranged in areas corresponding to the black matrix; and each light sensing unit 5 is connected with one touch scan line 3 and one touch sensing line 4. Arranging the light sensing units 5, the touch scan lines 3 and the touch sensing lines 4 in areas corresponding to the black matrix indicates that the touch scan lines 3 and the touch sensing lines 4 may be positioned below or above the black matrix or partially positioned above and partially positioned below the black matrix. For example, the touch scan lines are positioned below the black matrix, the touch sensing lines are positioned above the black matrix, the black matrix may shield both the touch scan lines 3 and the touch sensing lines 4, but the light sensing units 5 must be positioned on one side of the black matrix away from the array substrate, i.e., the light sensing units 5 must be positioned on one side of the black matrix that can receive external light. If the touch sensing lines and/or touch scan lines and the light sensing units are positioned on different sides of the black matrix, the touch sensing lines and/or touch scan lines may be connected with the light sensing units through via holes or in other manner. The substrate and the black matrix are not shown in FIG. 2.

The color filter layer in each pixel unit may include red, green and blue color filter areas, or red, green, blue and white color filter areas, or red, green, blue and yellow color filter areas or a plurality of other color filter areas capable of realizing normal display. This embodiment is described by taking a case in which the red, green and blue color filter areas are included as an example.

In this solution, the light sensing unit 5 may be specifically arranged in the red color filter area, the green color filter area or the blue color filter area, and preferably in the blue color filter area. Because human eyes are less sensitive to blue, when the light sensing unit 5 is arranged in the blue color filter area, human eyes may not easily notice the difference of the display effect due to arrangement of the light sensing unit 5, and thus a better display effect is ensured.

In the technical solution of Embodiment I of the present invention, the wiring complexity in the pixel units of the array substrate can be reduced by arranging the touch scan lines 3 and the touch sensing lines 4 for realizing the touch function on the color filter substrate, so that the difficulty in manufacturing the array substrate is reduced and the yield is improved.

It should be noted that, in the present invention, position of the black matrix on the color filter substrate corresponds to positions of the gate lines and the data lines on the array substrate. The color filter areas correspond to the pixel units defined by the gate lines and the data lines on the array substrate.

The principle of the technical solution of the present invention will be described in detail below in combination with FIG. 2. Both the touch scan lines 3 and the touch sensing lines 4 are arranged on the color filter substrate. Both the touch scan lines 3 and the touch sensing lines 4 are arranged below or above the black matrix or one of the touch scan line 3 and the touch sensing line 4 is arranged above the black matrix and the other one is arranged below the black matrix, so that the touch scan lines 3 and the touch sensing lines 4 on the color filter substrate correspond to the gate lines and the data lines on the array substrate. Therefore, the black matrix which originally only shield the gate lines and the data lines can shield the touch scan lines 3 and the touch sensing lines 4 without enlarging the area thereof, and accordingly, the light-transmissive areas of the pixel units are not reduced, and compared with the prior art, the present invention effectively improves the aperture ratio of the pixel units.

Figure 3:
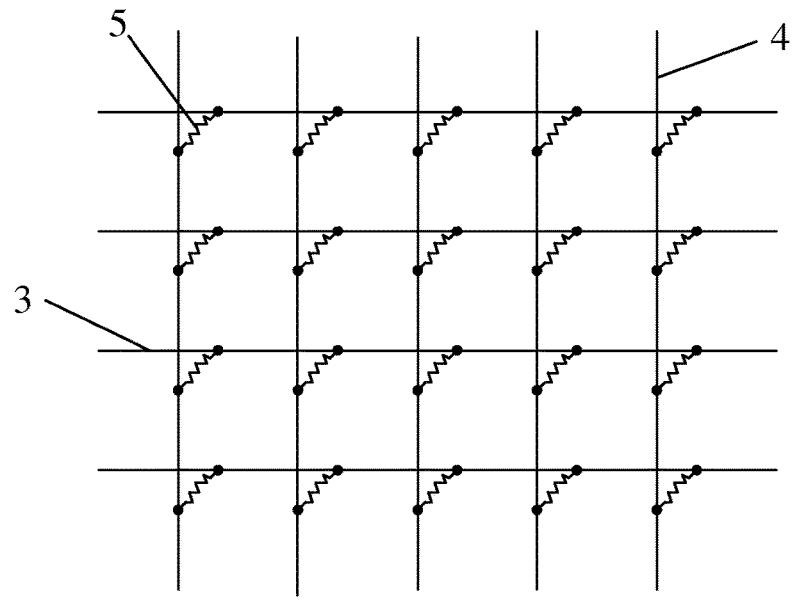
FIG. 3 is an equivalent circuit diagram of a part of the color filter substrate provided by Embodiment I of the present invention.

FIG. 3 is an equivalent circuit diagram of a part of the color filter substrate provided by Embodiment I of the present invention.

For ease of manufacturing, preferably, each light sensing unit 5 has an integrated structure. In order to determine the position of a touch point easily, the light sensing unit 5 may be configured in such a way that when the light sensing unit 5 is irradiated by specific light, the light sensing unit 5 enables the touch scan line 3 to be connected to the touch sensing line 4, as shown in FIG. 3.

The "specific light" herein indicates light capable of exciting the light sensing units 5, and is selected depending on the material for manufacturing the light sensing units 5.

As an implementation of the present invention, the light sensing units 5 may be made of a material that can be excited by natural light. In this case, in the absence of a touch, the light sensing units 5 are irradiated by natural light and enable the touch scan lines 3 to be connected to the touch sensing lines 4; and in the presence of a touch, the natural light at the touch point is blocked, and the light sensing unit 5 corresponding to the touch point cannot be excited, so that the corresponding touch scan line and touch sensing line are not connected, and thus the position of the touch point can be determined.

As another implementation of the present invention, the light sensing units 5 may be made of a material which cannot be excited by natural light (e.g. the light sensing units 5 can be excited by unnatural light such as infrared or ultraviolet). In this case, in the absence of a touch, when the light sensing units 5 are irradiated by natural light, the light sensing units 5 are in a non-excited state, and the touch scan lines 3 are disconnected from the touch sensing lines 4; and in the presence of a touch, the "specific light" may be generated at the position of the touch point, and the light sensing unit 5 corresponding thereto is excited to enable the touch scan line 3 to be connected to the touch sensing line 4. Thus, the position of the touch point can be determined.

How to generate the specific light at the touch point in the presence of a touch is not within the discussed scope of the present invention, and therefore, is not specifically described.

Further, a timing pulse signal is applied to the touch scan line 3. The touch sensing line 4 outputs a pulse signal having the same time sequence as the timing pulse signal on the touch scan line 3 when the touch scan line 3 and the touch sensing line 4 are connected by the light sensing unit 5. With the color filter substrate provided by Embodiment I of the present invention, a working mode of row-by-row scanning may be adopted in positioning a touch point.

Figure 4:
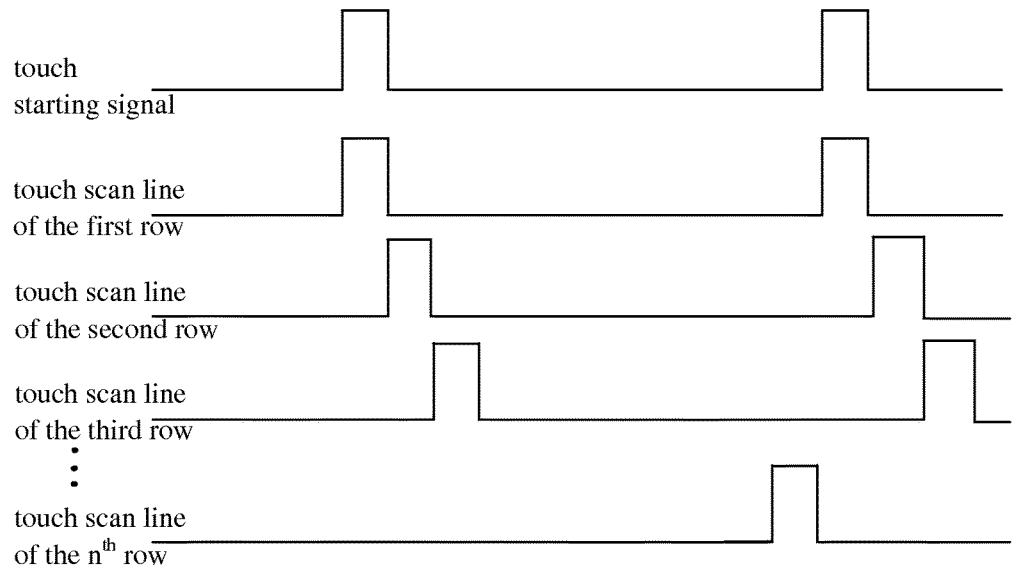
FIG. 4 is a timing diagram of signals applied to touch scan lines.

FIG. 4 is a timing diagram of signals applied to the touch scan lines. An external control unit applies a signal, which is a timing pulse signal, to the touch scan lines upon receipt of a touch starting signal. As shown in FIG. 4, the touch scan lines 3 receive the pulse signal row by row, namely, the touch scan line of the second row receives the rising edge of the first pulse signal when the touch scan line of the first row receives the falling edge of the first pulse signal, the touch scan line of the third row receives the rising edge of the first pulse signal when the touch scan line of the second row receives the falling edge of the first pulse signal, and so on, until all the touch scan lines 3 are scanned. Then, the above process is repeated from the first row.

In the implementation in which the light sensing units 5 are made of a material which cannot be excited by natural light, in the row-by-row scanning, if no touch occurs, the touch sensing lines 4 may output a low level signal or not output a signal as the conductivity of the light sensing units 5 is very poor; if a touch occurs, the light sensing unit 5 is irradiated by specific light and enables the touch scan line 3 to be connected to the touch sensing line 4, the signal output by the touch sensing line 4 may be changed, the touch sensing line 4 may output a pulse signal having the same time sequence as the time sequence pulse signal on the touch scan line 3, and an external processing unit receives the pulse signal output by the touch sensing line 4 and determines the position of the touch by determining the pulse signal, namely, the position of the X coordinate may be determined through the position of the touch sensing line 4, and the position of the Y coordinate may be obtained by comparing the pulse signal in the touch sensing line 4 with the pulse signal in touch scan line 3 of each row.

The above determination of the positions will be described with an example below. It is supposed that a touch occurs at the third pixel of the second row and the coordinates of the point are defined as (3, 2), the touch scan line of the second row and the touch sensing line corresponding to the third column of pixels are connected by the light sensing unit, the touch sensing line of the third column may output a pulse signal having the same waveform as the pulse signal in the touch scan line of the second row, but the strength of the pulse signals may be slightly different, the Y coordinate of the touch position may be determined by comparing the waveform of the pulse signal output by the touch sensing line with the waveform of the pulse signal of each touch scan line, and the X coordinate may be determined through the position of the touch sensing line outputting the pulse signal.

When there are multiple touch points, the processing unit may receive multiple pulse signals, but since row-by-row scanning is adopted, the time sequence of each pulse signal received by the processing unit is different. The processing unit can distinguish each pulse signal through the time sequence, and the corresponding position of each pulse signal can be obtained by calculation, that is, a multi-point touch function is realized.

In Embodiment I of the present invention, there are n rows of touch scan lines 3, m columns of touch sensing lines 4 and m×n light sensing units 5, and accordingly, the number of the touch units on the color filter substrate is m×n. In the practical design process, the number of the touch units may be set according to practical conditions.

The light sensing units 5 have an integrated structure, and a touch module adopts a working mode of row-by-row scanning, which can effectively prevent occurrence of a "ghost point" when a touch occurs. The so-called "ghost point" appears on a multi-point touch screen, for example, when two points on the touch screen in the prior art are touched, two horizontal ordinates and two longitudinal ordinates, which indicate four points in total, are determined as the touch positions on the screen, but only two points are actually touched, and therefore the other two points are ghost points.

Of course, a touch point can be positioned in many ways by using the light sensing units 5, the touch scan lines 3 and the touch sensing lines 4, and the above integrated structure design of the light sensing unit and the working mode of row-by-row scanning are adopted in a preferred solution of the present invention, rather than limiting the present invention.

Optionally, the light sensing unit 5 is arranged in each pixel unit. A touch point can be accurately positioned by arranging the light sensing unit 5 in each pixel unit. In practical use, the light sensing units 5 may be arranged in the pixel units at intervals. The pixel units are of a relatively small size, and when a finger touches the screen, the contact area between the finger and the screen is generally relatively large, and therefore, it is unnecessary to arrange the light sensing unit 5 in every pixel unit.

Optionally, the light sensing units 5 are photosensitive semiconductors.

In Embodiment I of the present invention, by arranging, on the color filter substrate, the light sensing units, the touch scan lines and the touch sensing lines for realizing a touch function, the aperture ratio of the pixel units can be effectively improved, the difficulty in manufacturing the touch screen is reduced, the yield is improved, and a multi-point touch function can also be realized.

Embodiment II

Embodiment II of the present invention provides a touch screen, which includes an array substrate and a color filter substrate opposite to each other, wherein the array substrate includes gate lines and data lines, and the color filter substrate is the one provided by the above-mentioned embodiment.

Figure 5:
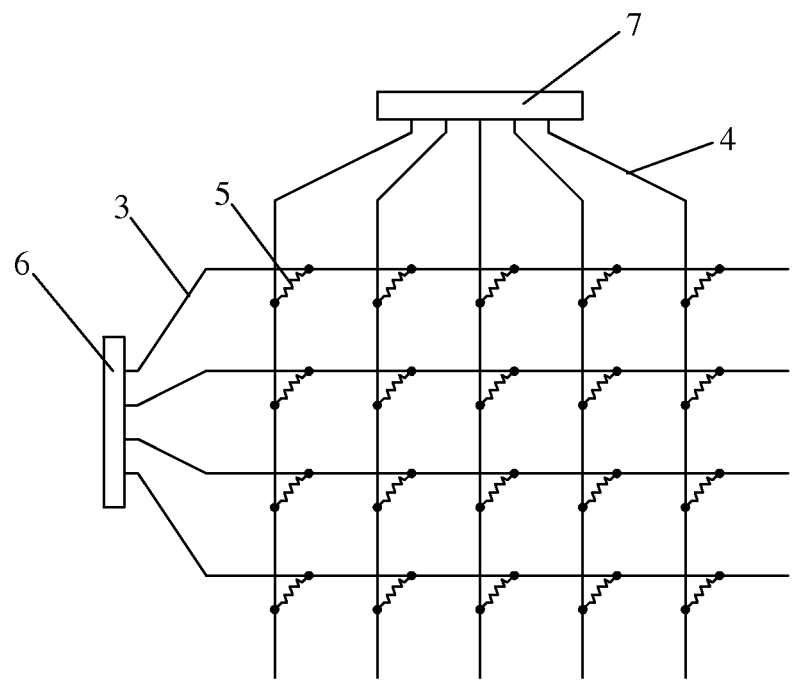
FIG. 5 is an equivalent circuit diagram of a part of a touch screen provided by Embodiment II of the present invention.

FIG. 5 is an equivalent circuit diagram of a part of the touch screen provided by Embodiment II of the present invention. As shown in FIG. 5, optionally, the touch screen includes a signal applying unit 6 configured to apply touch scan signals to the touch scan lines 3 and a signal processing unit 7 configured to receive and process touch sensing signals in the touch sensing lines 4, light sensing units 5 are provided at the intersections of the touch scan lines 3 and the touch sensing lines 4, and each light sensing unit 5 is connected with one touch scan line 3 and one touch sensing line 4. The signal applying unit 6 in Embodiment II of the present invention achieves the same function as the control unit in Embodiment I, and the touch scan signals may also be timing pulse signals; and the signal processing unit 7 achieves the same function as the processing unit in Embodiment I, and the touch sensing signals may also be pulse signals. However, the control unit and the processing unit are integrated on a circuit board outside the display screen in the prior art, whereas the signal loading unit 6 and the signal processing unit 7 can be directly arranged on the array substrate or the color filter substrate in the technical solution of Embodiment II of the present invention, and thus the space of the touch screen can be effectively utilized.

Optionally, the signal applying unit 6 and the signal processing unit 7 are arranged on the color filter substrate, the signal applying unit 6 is connected with the touch scan lines 3, and the signal processing unit 7 is connected with the touch sensing lines 4. Alternatively, the signal applying unit 6 and the signal processing unit 7 are positioned on the array substrate, the signal applying unit 6 is connected with the touch scan lines 3 through a flexible printed circuit board (PCB), and the signal processing unit 7 is connected with the touch sensing lines 4 through a flexible PCB.

Figure 6:
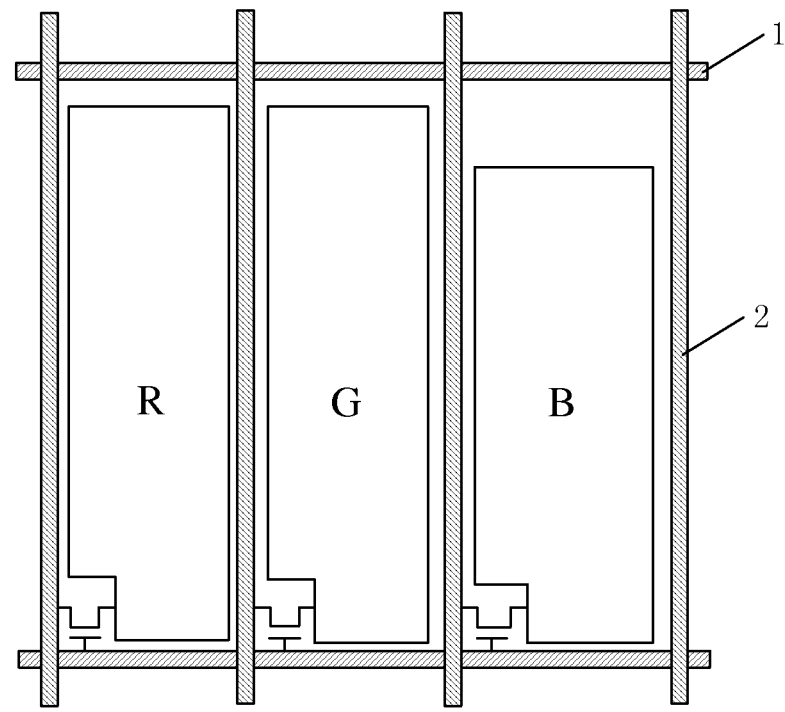
FIG. 6 is a schematic diagram of an array substrate of a touch screen provided by embodiment II of the present invention.

For the color filter substrate in the touch screen provided by Embodiment II of the present invention, its structural schematic diagram may refer to FIG. 2, and the specific structure features and the produced technical effects may refer to the description in the above-mentioned Embodiment I, which are not repeated herein. The structural schematic diagram of the array substrate in the touch screen provided by Embodiment II of the present invention is shown in FIG. 6, the array substrate is provided with gate lines 1 and data lines 2 for a display function, but not provided with touch scan lines and touch sensing lines for a touch function. Thus, wiring in the pixel units may become simple, the difficulty in manufacturing the touch screen is reduced, and more importantly, because the area of display areas in the pixel units is enlarged, the aperture ratio of the pixel units is improved.

It should be noted that, R, G and B in FIG. 6 merely represent areas, corresponding to a red color filter R, a green color filter G and a blue color filter B positioned on the color filter substrate, on the array substrate, rather than the color filters themselves.

In Embodiment II of the present invention, by arranging, on the color filter substrate, the light sensing units, the touch scan lines and the touch sensing lines for realizing a touch function, the aperture ratio of the pixel units can be effectively improved, the difficulty in manufacturing the touch screen is reduced, the yield is improved, and a multi-point touch function can also be realized.

Embodiment III

Figure 7:
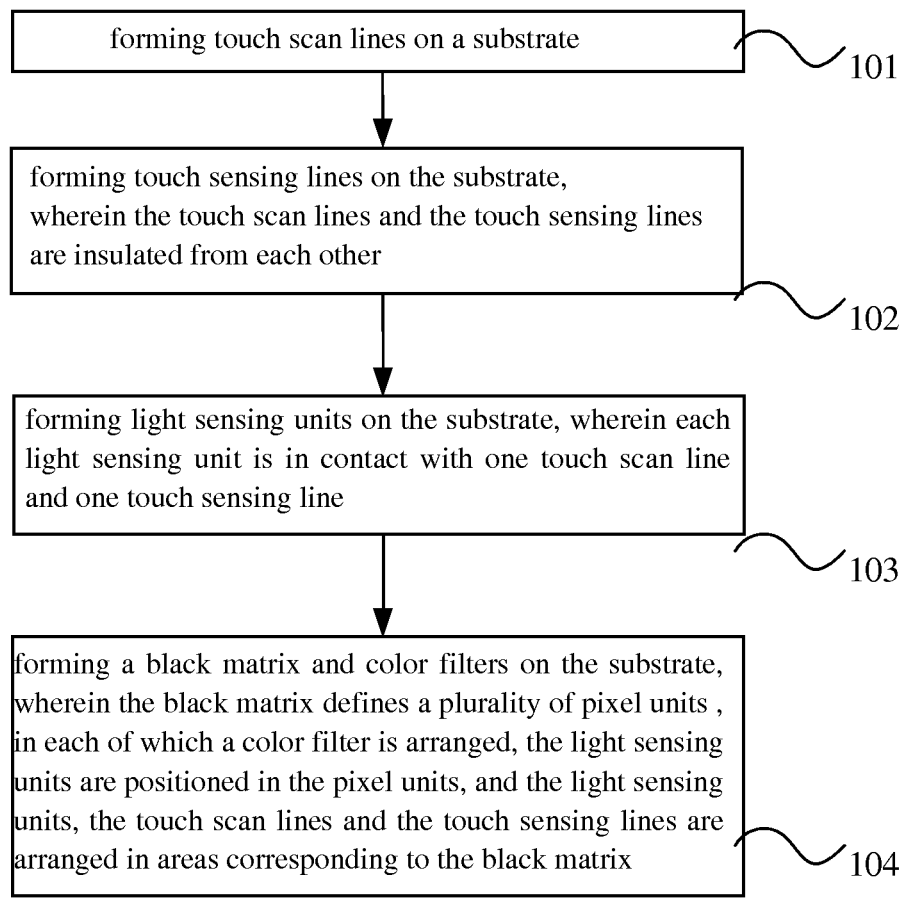
FIG. 7 is a flowchart of a manufacturing method of a color filter substrate provided by Embodiment III of the present invention.

FIG. 7 is a flowchart of a manufacturing method of a color filter substrate provided by Embodiment III of the present invention. The color filter substrate includes a substrate and a black matrix, light sensing units, touch scan lines and touch sensing lines arranged on the substrate, and the black matrix defines a plurality of pixel units, in each of which a color filter is arranged. As shown in FIG. 7, the manufacturing method includes steps of:

step 101, forming touch scan lines on a substrate;

step 102, forming touch sensing lines on the substrate, wherein the touch scan lines and the touch sensing lines are insulated from each other;

step 103, forming light sensing units on the substrate, wherein each light sensing unit is connected with one touch scan line and one touch sensing line; and step 104, forming a black matrix and color filters on the substrate, wherein the black matrix defines a plurality of pixel units, in each of which a color filter is arranged, the light sensing units are positioned in the pixel units, the light sensing units, the touch scan lines and the touch sensing lines are arranged in areas corresponding to the black matrix, and the light sensing units are positioned on one side of the black matrix that can receive external light.

It should be noted that, the sequence in which step 101, step 102, step 103 and step 104 are performed may be changed at random, that is, the sequence in which the touch scan lines, the touch sensing lines, the light sensing units, the black matrix and the color filters are manufactured is not limited. For example, the light sensing units may be formed first, then the touch scan lines and the touch sensing lines are formed, the light sensing units are connected with the touch scan lines and the touch sensing lines, and the black matrix and the color filters are finally formed. However, the light sensing units must be arranged on one side of the black matrix away from the array substrate, in other words, the light sensing units must be arranged on one side of the black matrix which can receive external light.

In Embodiment III of the present invention, the light sensing units, the touch scan lines and the touch sensing lines for realizing a touch function are first arranged on the substrate, and then the black matrix and the color filters are formed on the substrate, that is, the light sensing units, the touch scan lines and the touch sensing lines for realizing the touch function are formed on the color filter substrate. Therefore, the aperture ratio of the pixel units can be effectively improved, the difficulty in manufacturing the whole touch screen is reduced, the yield is improved, and a multi-point touch function can also be realized.

It should be noted that, the touch scan lines and the touch sensing lines in the present invention may be made of a metal material such as aluminum (Al), molybdenum (Mo) or Copper (Cu), or be made of indium tin oxide (ITO). The technical solutions provided by the present invention may be applied to in-cell touch screens.

It can be understood that, the above embodiments are merely exemplary embodiments adopted for explaining the principle of the present invention, rather than limiting the present invention. Various variations and improvements may be made by those skilled in the art without departing from the spirit and essence of the present invention, and these variations and improvements are considered as falling within the protection scope of the present invention. The embodiments of the present invention may omit some of the above technical features, and merely solve part of the technical problems existing in the prior art. Moreover, the disclosed technical features may be randomly combined. The scope of the present invention is defined by the appended claims and equivalent expressions thereof, and various variations and combinations may be made to the technical solutions disclosed in the appended claims by others skilled in the art.

The invention claimed is:

1. A color filter substrate to be disposed opposite to an array substrate comprising gate lines and data lines, comprising a substrate and a black matrix arranged on the substrate, wherein the black matrix defines a plurality of pixel units, in each of which a color filter is arranged; the color filter substrate further comprises light sensing units, touch scan lines and touch sensing lines, the touch scan lines and touch sensing lines are insulated from each other, and the light sensing units are positioned in the pixel units; the light sensing units, the touch scan lines and the touch sensing lines are arranged in areas corresponding to the black matrix; and each light sensing unit is connected with one touch scan line and one touch sensing line and is positioned on one side of the black matrix capable of receiving external light.

2. The color filter substrate of claim 1, wherein each light sensing unit has an integrated structure; and when the light sensing unit is irradiated by specific light, the light sensing unit enables the touch scan line to be connected to the touch sensing line.

3. The color filter substrate of claim 2, wherein a timing pulse signal is applied to the touch scan line;
the touch sensing line outputs a pulse signal having the same time sequence as the timing pulse signal on the touch scan line when the touch scan line and the touch sensing line are connected by the light sensing unit.

4. The color filter substrate of claim 3, wherein the light sensing units are photosensitive semiconductors.

5. The color filter substrate of claim 4, wherein each color filter comprises a red color filter area, a green color filter area and a blue color filter area, and the light sensing unit is arranged in the blue color filter area.

6. The color filter substrate of claim 3, wherein each color filter comprises a red color filter area, a green color filter area and a blue color filter area, and the light sensing unit is arranged in the blue color filter area.

7. The color filter substrate of claim 2, wherein the light sensing units are photosensitive semiconductors.

8. The color filter substrate of claim 7, wherein each color filter comprises a red color filter area, a green color filter area and a blue color filter area, and the light sensing unit is arranged in the blue color filter area.

9. The color filter substrate of claim 2, wherein each color filter comprises a red color filter area, a green color filter area and a blue color filter area, and the light sensing unit is arranged in the blue color filter area.

10. The color filter substrate of claim 1, wherein each pixel unit is provided therein the light sensing unit, or the light sensing units are arranged in the pixel units having intervals therebetween.

11. The color filter substrate of claim 10, wherein the light sensing units are photosensitive semiconductors.

12. The color filter substrate of claim 10, wherein each color filter comprises a red color filter area, a green color filter area and a blue color filter area, and the light sensing unit is arranged in the blue color filter area.

13. The color filter substrate of claim 1, wherein the light sensing units are photosensitive semiconductors.

14. The color filter substrate of claim 13, wherein each color filter comprises a red color filter area, a green color filter area and a blue color filter area, and the light sensing unit is arranged in the blue color filter area.

15. The color filter substrate of claim 1, wherein each color filter comprises a red color filter area, a green color filter area and a blue color filter area, and the light sensing unit is arranged in the blue color filter area.

16. A touch screen, comprising an array substrate and a color filter substrate opposite to each other, wherein the color filter substrate is the color filter substrate of claim 1.

17. The touch screen of claim 16, further comprising a signal applying unit and a signal processing unit, wherein
the signal applying unit is configured to apply touch scan signals to the touch scan lines; and
the signal processing unit is configured to receive and process touch sensing signals in the touch sensing lines.

18. The touch screen of claim 17, wherein both the signal applying unit and the signal processing unit are arranged on the color filter substrate, the signal applying unit is connected with the touch scan lines, and the signal processing unit is connected with the touch sensing lines.

19. The touch screen of claim 17, wherein both the signal applying unit and the signal processing unit are arranged on the array substrate, the signal applying unit is connected with the touch scan lines through a flexible printed circuit board, and the signal processing unit is connected with the touch sensing lines through a flexible printed circuit board.

20. A manufacturing method of a color filter substrate to be disposed opposite to an array substrate comprising gate lines and data lines, comprising steps of:
forming touch scan lines on a substrate;
forming touch sensing lines on the substrate, wherein the touch scan lines and the touch sensing lines are insulated from each other;
forming light sensing units on the substrate, wherein the light sensing units are connected with the touch scan lines and the touch sensing lines; and
forming a black matrix and color filters on the substrate, wherein the black matrix defines a plurality of pixel units, in each of which a color filter is arranged, the light sensing units are positioned in the pixel units, the light sensing units, the touch scan lines and the touch sensing lines are arranged in areas corresponding to the black matrix, and the light sensing units are positioned on one side of the black matrix capable of receiving external light.

* * * * *